(12) United States Patent
Hom et al.

(10) Patent No.: US 8,364,655 B2
(45) Date of Patent: Jan. 29, 2013

(54) HYBRID OFF-PEAK AND JUST-IN-TIME INTEGRATION

(75) Inventors: Richard V. Hom, Troy, MI (US); Eric M. Nelson, Durham, NC (US); James C. North, Virginia Beach, VA (US)

(73) Assignee: International Business Machines Corporation, Armonk, NY (US)

(*) Notice: Subject to any disclaimer, the term of this patent is extended or adjusted under 35 U.S.C. 154(b) by 156 days.

(21) Appl. No.: 12/893,468

(22) Filed: Sep. 29, 2010

(65) Prior Publication Data

US 2012/0078862 A1    Mar. 29, 2012

(51) Int. Cl.
    G06F 17/00    (2006.01)
(52) U.S. Cl. .......................................... 707/694
(58) Field of Classification Search .................... 707/694
    See application file for complete search history.

(56) References Cited

U.S. PATENT DOCUMENTS

| | | | |
|---|---|---|---|
| 6,523,027 B1 | 2/2003 | Underwood | |
| 6,615,253 B1 | 9/2003 | Bowman-Amuah | |
| 6,901,410 B2 | 5/2005 | Marron et al. | |
| 7,698,323 B1 | 4/2010 | Rangan et al. | |
| 7,840,588 B2 * | 11/2010 | Bell et al. | 707/769 |
| 2003/0093583 A1 | 5/2003 | Doran et al. | |
| 2006/0179140 A1 * | 8/2006 | John et al. | 709/225 |
| 2008/0126309 A1 * | 5/2008 | Rowley | 707/3 |
| 2008/0133712 A1 | 6/2008 | Friedman et al. | |
| 2009/0063417 A1 | 3/2009 | Kinder | |

* cited by examiner

*Primary Examiner* — Neveen Abel Jalil
*Assistant Examiner* — Jagdish Pandya
(74) *Attorney, Agent, or Firm* — John A. Pivnichny; Ronald A. D'Alessandro; Keohane & D'Alessandro PLLC (57) ABSTRACT

The invention is directed to off-peak and just-in-time (JIT) retrieval of directory information to reduce network traffic and load on directory servers and/or data sources by requesting only the information that is currently needed from the directory server, while subsequently updating the directory information during an off-peak period in the case that the directory information retrieved in a JIT manner is outdated. In these embodiments, a hybrid integrator operable with an integration directory capable of retrieving directory information in a JIT manner provides this functionality.

20 Claims, 8 Drawing Sheets

HYBRID OFF-PEAK AND JUST-IN-TIME INTEGRATION

This invention was made with Government support under contract No. USJFCOM CRADA #07-10 awarded by the U.S. Department of Defense (DOD). The Government has certain rights in this invention.

CROSS-REFERENCE TO RELATED APPLICATIONS

This application is related in some aspects to the commonly owned and co-pending application entitled "JUST-IN-TIME WRAPPER SYNCHRONIZATION," filed Sep. 29, 2010, Ser. No. 12/893,437, and commonly owned and co-pending application entitled "INTEGRATED JUST-IN-TIME SYNCHRONIZATION," filed Sep. 29, 2010, Ser. No. 12/893,453, the entire contents of which are herein incorporated by reference.

FIELD OF THE INVENTION

This invention relates generally to directory server integration, and more specifically, to combining just-in-time (JIT) directory integration with in-bulk integration during off-peak periods.

BACKGROUND OF THE INVENTION

Today, people and businesses rely on networked computer systems to support distributed applications. As the number of different networks and applications has grown, the number of specialized directories of information has also grown, resulting in islands of information that are difficult to share and manage. If all of this information could be maintained and accessed in a consistent and controlled manner, it would provide a focal point for integrating a distributed environment into a consistent and seamless system. The Lightweight Directory Access Protocol (LDAP) is an open industry standard that has evolved to meet these needs. LDAP is based on the client/server model of distributed computing and defines a standard method for accessing and updating information in a directory. In computer terms, a directory is a specialized database, also called a data repository, that stores typed and ordered information about objects.

LDAP has gained wide acceptance as the directory access method of the Internet and is therefore also becoming strategic within organizations. It is being supported by a growing number of software vendors and is being incorporated into a growing number of applications. However, current solutions propagate too much data and information too frequently, resulting in unnecessarily large databases and data transfers. Existing directory integration methods fetch data before it is requested. A large batch of data is retrieved from the data sources, while the data in the directory is replaced. Any subsequent changes to the sources are also changed in the directory. Thus, all of the data is propagated because it is not determined what information will be needed by the client in the future. The alternative, just-in-time integration, performs synchronization when a request is received. However, because synchronization is performed as soon as requested, the bulk of the processing will occur during peak-hours.

SUMMARY OF THE INVENTION

In one embodiment, there is a method for combining off-peak and just-in-time (JIT) retrieval of directory information. In this embodiment, the method comprises: providing a hybrid integrator operating with an integration directory capable of retrieving directory information in a JIT manner; receiving a request for directory information at the hybrid integrator; recording the request in the hybrid integrator; determining, during an off-peak period, whether each of a set of current attribute values corresponding to the request is current; and retrieving, during the off-peak period, a set of updated current attribute values based on the determining, wherein the set of updated current attribute values is retrieved from at least one of the following: a directory server, and an external source.

In a second embodiment, there is a directory apparatus for off-peak and just-in-time (JIT) retrieval of directory information, the directory apparatus comprising a directory server operable with an integration directory capable of retrieving directory information in a JIT manner; memory operably associated with the directory server; and a hybrid integrator storable in memory and executable by the directory server, the hybrid integrator comprising: a transaction recorder configured to receive a request for directory information, and to record the request; and an off-peak integrator configured to: determine, during an off-peak period, whether each of a set of current attribute values corresponding to the request is current; and retrieve, during the off-peak period, a set of updated current attribute values in the case that one of the set of current attribute values corresponding to the request is not current, wherein the set of current attribute values is retrieved from at least one of the following: the directory server, and an external source.

In a third embodiment, there is a computer-readable medium storing computer instructions, which when executed, enables a computer system operating with a directory server to provide off-peak and just-in-time (JIT) retrieval of directory information. In this embodiment, the computer instructions comprise: receiving a request for directory information at a hybrid integrator; recording the request in the hybrid integrator; retrieving, by an integration directory, a set of current attribute values in a JIT manner from at least one of the following: a directory server, and an external source; determining, during an off-peak period, whether each of the set of current attribute values is current; and retrieving, during the off-peak period, a set of updated attribute values based on the determining, wherein the set of updated current attribute values is retrieved from at least one of the following: the directory server, and the external source.

In a fourth embodiment, there is a method for deploying a hybrid integrator and an integration directory for use in a computer system to provide off-peak and just-in-time (JIT) retrieval of directory information. In this embodiment, a computer infrastructure is provided and is operable to: receive a request for directory information at a hybrid integrator; record the request in the hybrid integrator; retrieve, by an integration directory, a set of current attribute values in a JIT manner from at least one of the following: a directory server, and an external source; determine, during an off-peak period, whether each of the set of current attribute values is current; and retrieve, during an off-peak period, a set of updated attribute values based on the determining, wherein the set of updated current attribute values is retrieved from at least one of the following: the directory server, and the external source.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. For example, embodiments of the invention may be described in the context of Lightweight Directory Access Protocol (LDAP). It will be appreciated, however, that the invention applies to virtually any directory interface, including, but not limited to LDAP. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus appearances of the phrases "in one embodiment," "in an embodiment," "in embodiments" and similar language throughout this specification may, but do not necessarily, all refer to the same embodiment.

Embodiments of this invention are directed to off-peak and JIT retrieval of directory information to reduce network traffic and load on directory servers and/or data sources by requesting only the information that is currently needed from the directory server, and subsequently updating the directory information during an off-peak period in the case that the directory information retrieved in a JIT manner is not current (i.e., outdated, stale, etc.). In these embodiments, a hybrid integrator operable with an integration directory capable of retrieving directory information in a JIT manner provides this functionality. Specifically, the hybrid integrator and the integration directory are configured to receive a request for directory information at the hybrid integrator, and record the request. During an off-peak period, it is determined whether each of a set (i.e., one or more) of current attribute values corresponding to the request is current. Based on whether each of the set of current attribute values corresponding to the request is current, a set of updated current attributes is retrieved from at least one of the following: a directory server, and an external source. The integration directory propagates information in a JIT manner so that only the information that will be currently used by the client is propagated across the network, while the hybrid integrator tracks incoming requests from a client and refreshes a subset of the propagated information data during off-peak hours.

Figure 1:
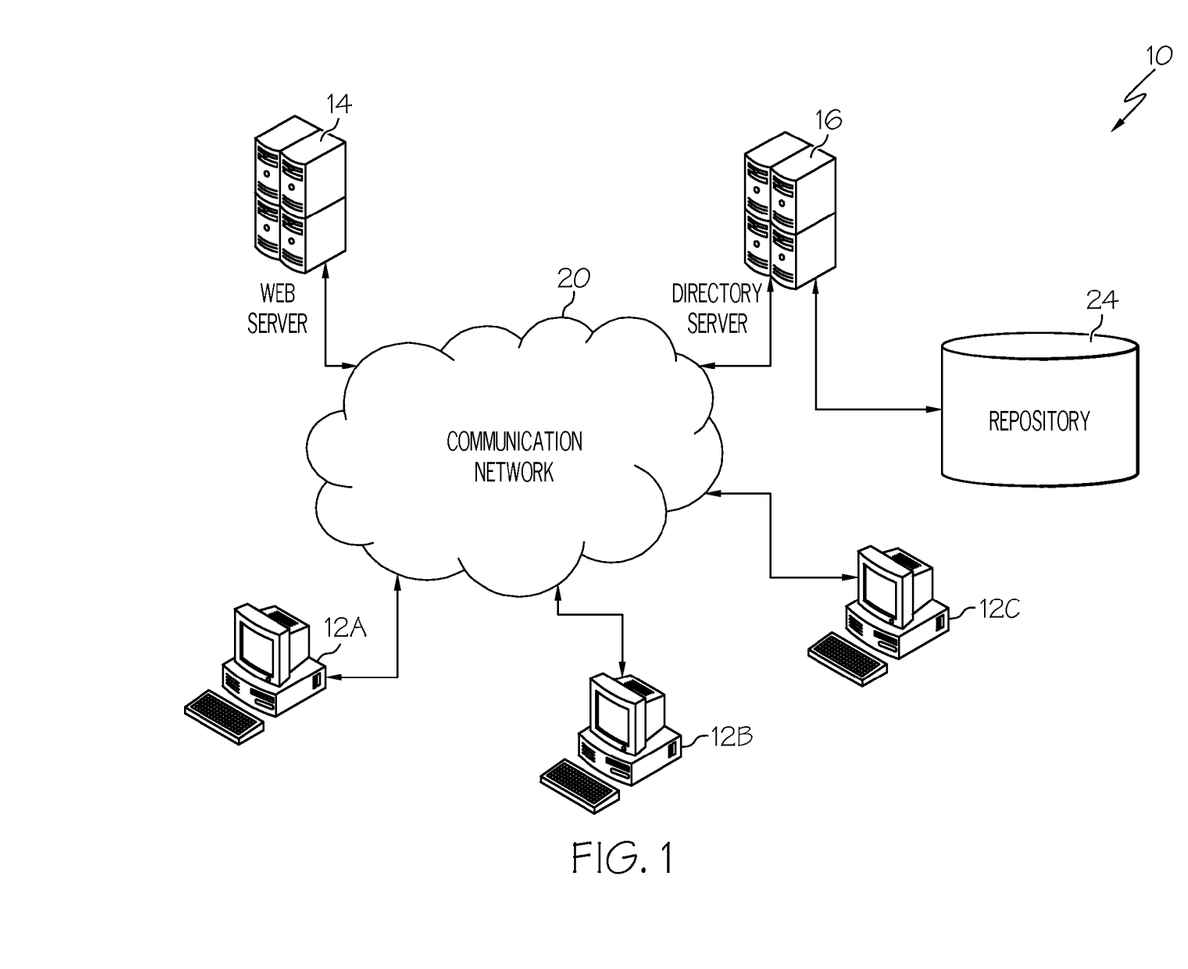
FIG. 1 illustrates network architecture including a communication link between network-connected clients and a directory server according to embodiments of the invention.

FIG. 1 illustrates network architecture 10 including a communication link between network-connected clients and a directory server (e.g., a LDAP directory server) according to embodiments of this invention. As shown, network architecture 10 may include clients 12A, 12B, 12C coupled with a web server 14 (or a set of web servers) and directory server 16 (or a set of directory servers) via a communication network 20 (e.g., a public network such as the Internet or a private network such as a local area network (LAN)). The client devices 12A, 12B, 12C may be, for example, server devices for Enterprise Service Bus, Policy Decision Points, Policy Enforcement Points, personal computers (PCs), mobile phones, palm-sized computing devices, personal digital assistants (PDAs), etc.

Communication network 20 may be described in a simplified manner as a collection of computer systems (e.g., clients and servers) that are interconnected by transmission lines (or wireless transmissions) and routers/switches to enable the transfer of information among them, as illustrated in FIG. 1. These computer systems are often modeled by their functions: client-server. In the client-server model, communication generally takes the form of a request from the client to the server asking for an operation to be performed (e.g., request for directory data). The server performs the work and sends a reply. A client may then retrieve and display the requested information. However, a computer system may operate as both a server and a client.

Client-server systems communicate with each other using a variety of network protocols, such as Transmission Control Protocol/Internet Protocol (TCP/IP) and Integrated Packet Exchange (IPX), and a variety of application protocols, such as Hypertext Transfer Protocol (HTTP) and File Transfer Protocol (FTP). A user typically views the network as a collection of web pages that are typically located on a server at a network site. Each web page may contain text, embedded components such as graphic image files, and address links to other pages referred to as a Uniform Resource Locator (URL). Web pages are viewed using a program called a web browser that resides on a user's client device. The web browser retrieves information from a requested page on a server, interprets the data and formatting commands, and displays the text and special accessory files, such as images, on the user's client device. Web pages may be created using Hypertext Markup Language (HTML) with hypertext and other information to be displayed in a web browser.

Directory server 16 operates with a repository 24, which may be a directory of data entries containing LDAP information (e.g., an attribute store), repository 24 being stored, for example, in directory server 16. Upon receiving a request for information from any of the clients 12A, 12B, 12C, the request is sent to and received directly by directory server 16. Alternatively, web server 14 retrieves data from directory server 16, which in turn retrieves data from its associated repository 24.

LDAP is a networking protocol for querying and modifying directory services running over TCP/IP. Repository 24 may contain a tree of data entries, each of which comprises a collection of attributes that contain information about an object. Every attribute has a type and one or more values. The type of the attribute is associated with the syntax, which specifies the kind of values the can be stored (e.g., cn (common name), sn (surname), givenName, mail, uid, and userPassword). Schemas define the type of objects that can be stored in the directory. Schemas also list the attributes of each object type and whether these attributes are required or optional. Repository 24 may be any type of recordable media including but not limited to DASD (direct access storage device), floppy disk, CD ROM, DVD, semiconductor memory, or magnetic tape along with a drive or other apparatus for accessing data in the directory entries. Repository 24 may be either rewritable media, or read-only. If read-only then the directory entries have to be placed on the media by some process other than use of the drive or apparatus used for access.

Attributes within repository 24 will often have different names and syntaxes in source and target systems. Some attribute values for a target system don't have a direct mapping and may have to be computed from values in one or more source systems, for example, as when first name, middle initial, and last name in a system are combined to create a cn (common name) attribute in repository 24. However, attribute mapping rules can be much more complex. For example, the users in LDAP repositories can be organized into a hierarchical directory tree with a distinguished name (DN) that specifies the precise location of their entry in the tree. When groups are synchronized between directories with different tree structures the groups contain the DNs of users in a member attribute. The DNs have to be mapped between the tree structures as the group entries are copied or synchronized between the directories. As discussed in further detail below, repository 24 maintains both internal values and attribute values from other sources (e.g., external sources), as well as information on how to retrieve these external values, how long they can be used, and how to select between the values when similar and/or multiple values exist.

Figure 2:
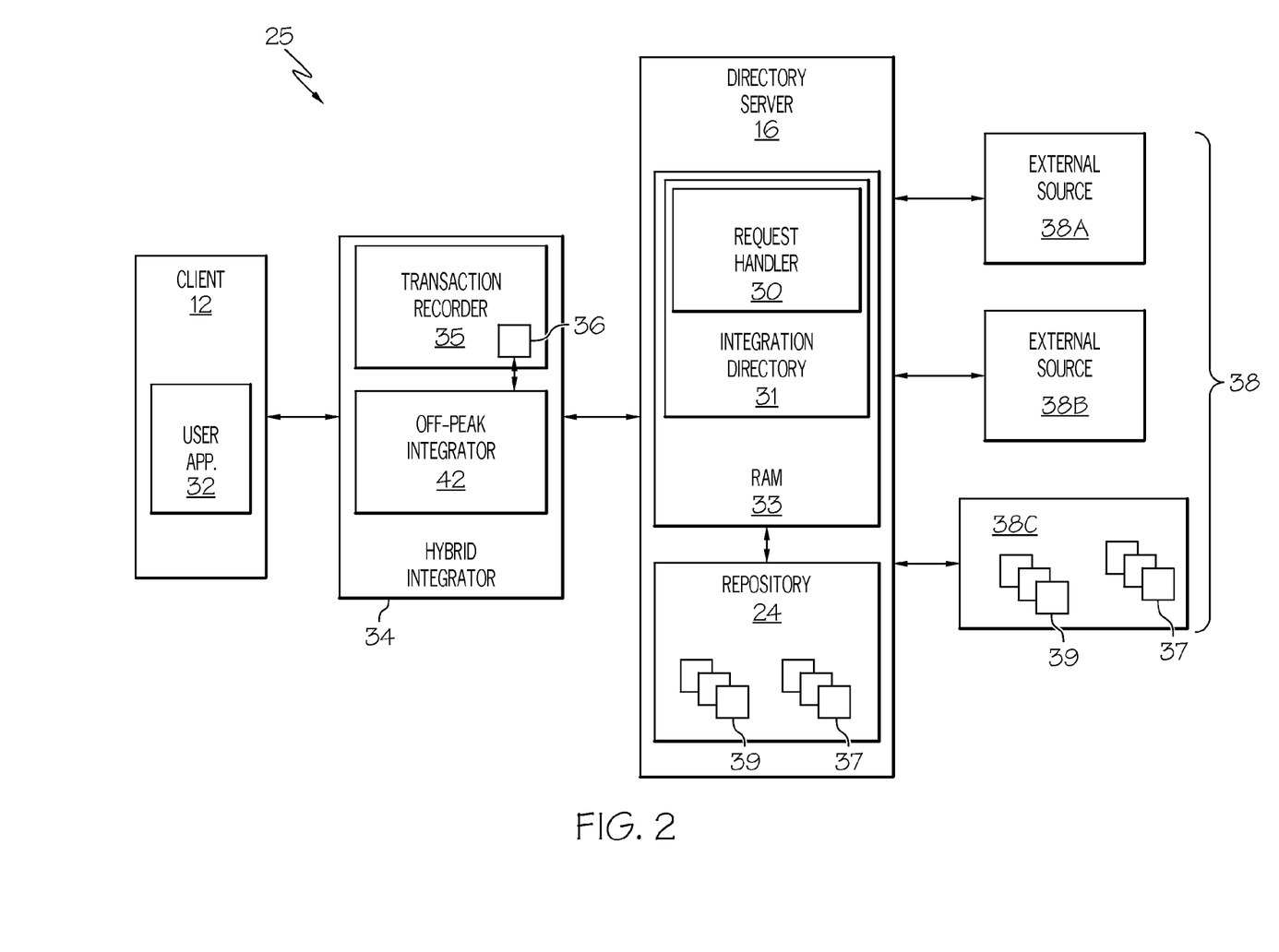
FIG. 2 shows a more detailed view of a directory apparatus for off-peak and just-in-time (JIT) retrieval of directory information that operates in the environment shown in FIG. 1 according to embodiments of the invention.

Referring now to FIG. 2, a directory apparatus 25 for off-peak and JIT retrieval of LDAP information (i.e., data) that operates in the environment shown in FIG. 1 is described in more detail. Directory apparatus 25 comprises directory server 16 and repository 24 operating with a user application 32 (e.g., any software application having a need for directory data, such as directory entries on repository 24) on client 12.

As shown, directory server 16 includes a request handler 30 (e.g., software code, program module, application program etc.) and an integrating directory 31 stored in random access memory (RAM) 33. Integrating directory 31 comprises software that accepts directory requests and retrieves information from repository 24. In a preferred embodiment, request handler 30 is a component of integration directory 31, and adds the JIT integration functionality to integrating directory 31 and directory server 16. During operation, request handler 30 remains inactive until a request is received from client 12. Request handler 30 integrates in a JIT manner, i.e., only when a request is made, so that only the data requested is fetched.

Directory server 16 is coupled to a hybrid integrator 34, which is adapted to interface with a user application 32 on client 12. In this embodiment, hybrid integrator 34 is shown external to directory server 16 as a wrapper component, which is defined herein as software code, a program module(s), application program(s), etc., that takes lower level information and makes it usable at a higher level. It will be appreciated that hybrid integrator 34 could alternatively be configured as an integral part of integration directory 31 and directory server 16. In both configurations, hybrid integrator 34 is configured to retrieve directory information from repository 24 during an off-peak period in the case that previously retrieved directory information has become outdated.

Figure 3:
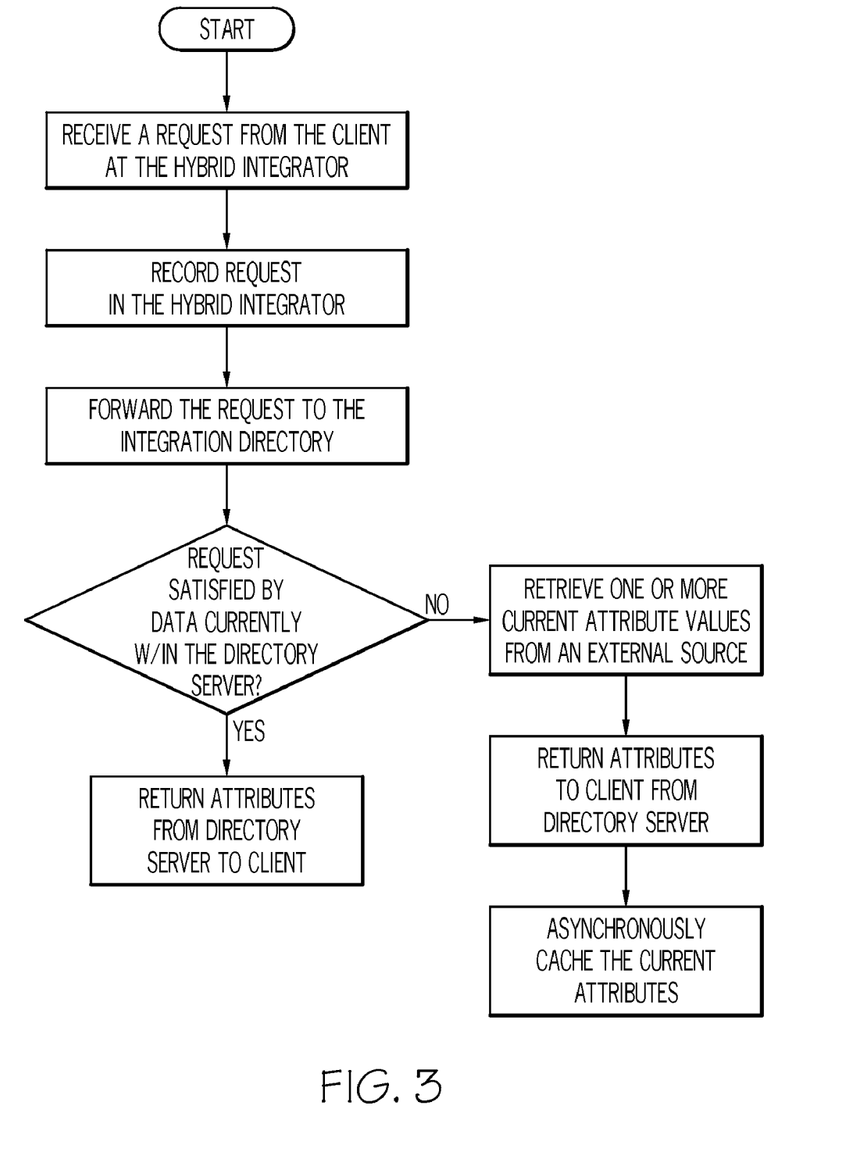
FIG. 3 shows a flow diagram of a method for off-peak and just-in-time (JIT) retrieval of directory information according to embodiments of the invention.

During operation, as shown in FIGS. 2-3, user application 32 sends a query or request from client 12 across a path, which is received at hybrid integrator 34. A transaction recorder 35 within hybrid integrator 34 is configured to receive the request(s) for directory information, and to record details of the request within a transaction log 36 for subsequent off-peak processing. Transaction recorder 35 forwards the request to integration directory 31 after the request is recorded in transaction log 36 of hybrid integrator 34. Integration directory 31 operates with directory server 16 via request handler 30, and is configured to determine a location corresponding to a set of current attribute values 37 for responding to the request. The location of current attribute values 37, shown here within repository 24 of directory server 16 and an external source 38C for exemplary purposes only, depends on whether the request can be satisfied by data currently within directory server 16. As used herein, a current attribute value is an attribute value that has been updated within a determined period of time to assure that the information is sufficiently up-to-date.

Once the location is determined, integration directory 31 is configured to retrieve set of current attribute values 37 (asynchronously or synchronously) in a JIT manner from at least one of the following: directory server 16, and an external source 38 (e.g., an LDAP provider). If the request can be satisfied by data currently within directory server 16, then the current attribute value(s) is returned to client 12 from directory server 16, thus reducing network traffic and load on external sources 38. However, in the case that the request cannot be satisfied by data currently within directory server 16 (e.g., an attribute value is stale), at least one of set of current attribute values 37 is asynchronously retrieved from external sources 38A, 38B, and/or 38C.

Once set of current attribute values 37 is retrieved, and the corresponding current attributes are returned from directory server 16 to client 12 via hybrid integrator 34, request handler 30 asynchronously caches the set of current attribute values in repository 24 and updates a refresh value for each of set of current attribute values 37. The refresh value represents the date and time that the attribute values were cached in repository 24, as well as how long they can be used before becoming stale. The refresh and staleness limits may be specified by an administrator. Caching the current attribute values in repository 24 reduces network traffic and load on external sources 38, and provides a redundant source in case any of external sources 38 fail.

Figure 4:
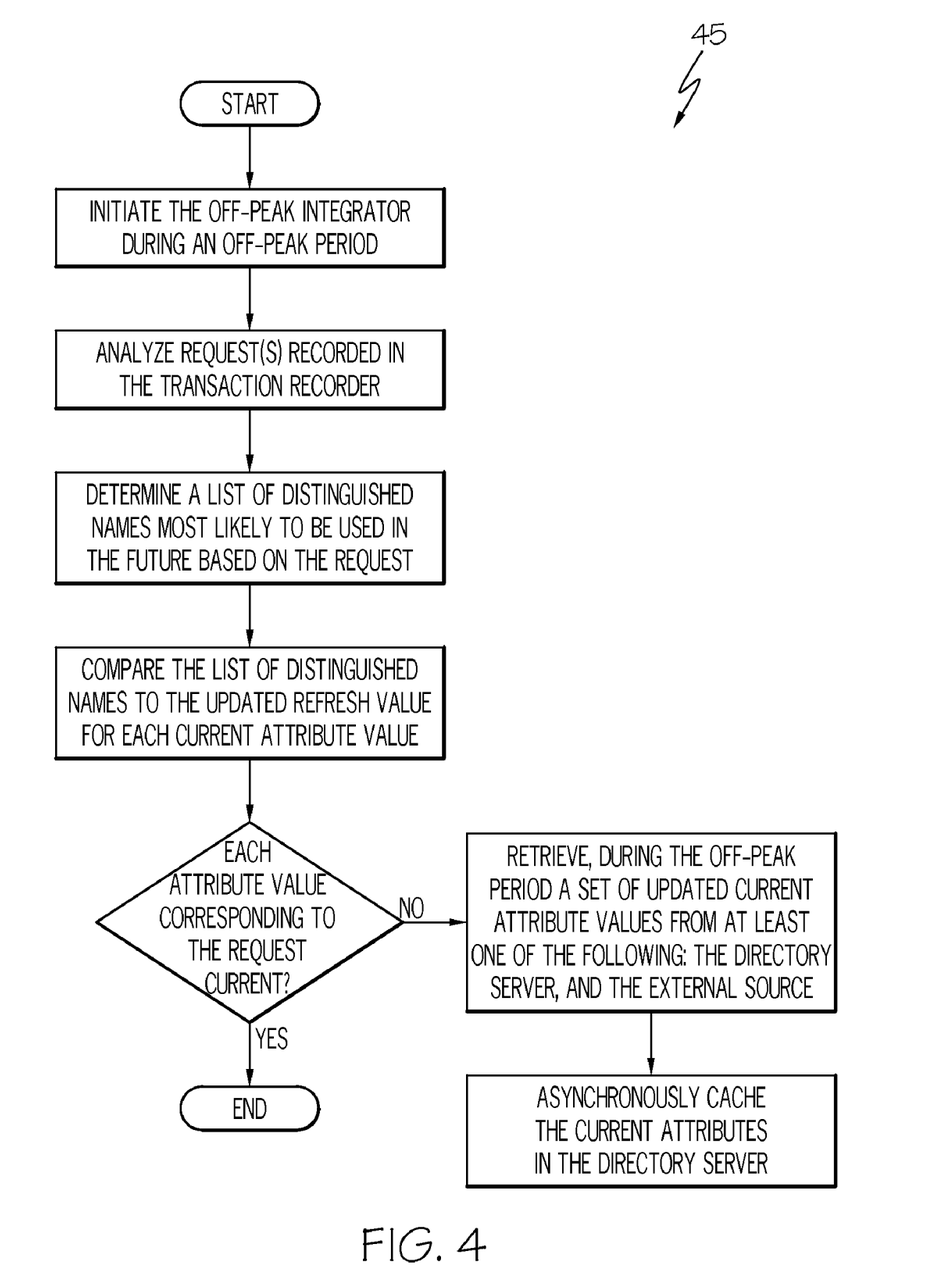
FIG. 4 shows a flow diagram of a process for retrieving updated directory information during an off-peak period in the case that the directory information retrieved in a JIT manner is outdated according to embodiments of the invention.

Referring now to FIGS. 2 and 4, a process 45 for retrieving updated directory information will be described in further detail. During an off-peak period (e.g., a time period after regular business hours when network traffic is lighter, or after the hybrid integrator has been sitting idle for a given period of time), an off-peak integrator 42 of hybrid integrator 34 is initiated to determine whether each of set of current attribute values 37 corresponding to the request is current. To accomplish this, off-peak integrator 42 is configured to analyze request log 36 (i.e., a list detailing one or more requests for directory information) recorded in transaction recorder 35 and to determine a set of distinguished names (DN) most likely to be used in the future based on the request. If necessary, off-peak integrator 42 may rerun queries/requests in the request log 36 to determine the set of DN. In one embodiment, it is assumed that the past history of requests is an indication of future activity. Off-peak integrator 42 then compares the set of distinguished names to the updated refresh value stored within repository 24 for each of set of current attribute values 37 to determine which attribute values have gone stale or will go stale within a predetermined threshold.

Off-peak integrator 42 collaborates with integration directory 31 to retrieve, during the off-peak period, a set of updated current attribute values 39 in the case that one set of current attribute values 37 is not current. As used herein, updated current attribute values 39 are one or more current attribute values that have been refreshed (i.e., retrieved) within a determined period of time to assure that the information previously retrieved by integration directory 31 in a JIT manner is sufficiently up-to-date. Set of updated current attribute values 39 is retrieved from at least one of the following: the directory server 16, and an external source 38. Integration directory 31 operates with directory server 16 via request handler 30, and is configured to determine the location corresponding to set of updated current attribute values 39 for responding to the request. The location of updated current attribute values 39, shown here within directory server 16 and an external source 38C for exemplary purposes only, depends on whether the request can be satisfied by data currently within directory server 16. Once set of updated current attribute values 39 is retrieved, request handler 30 asynchronously caches the updated current attribute values 39 in repository 24 to be accessed during subsequent requests.

Figure 5:
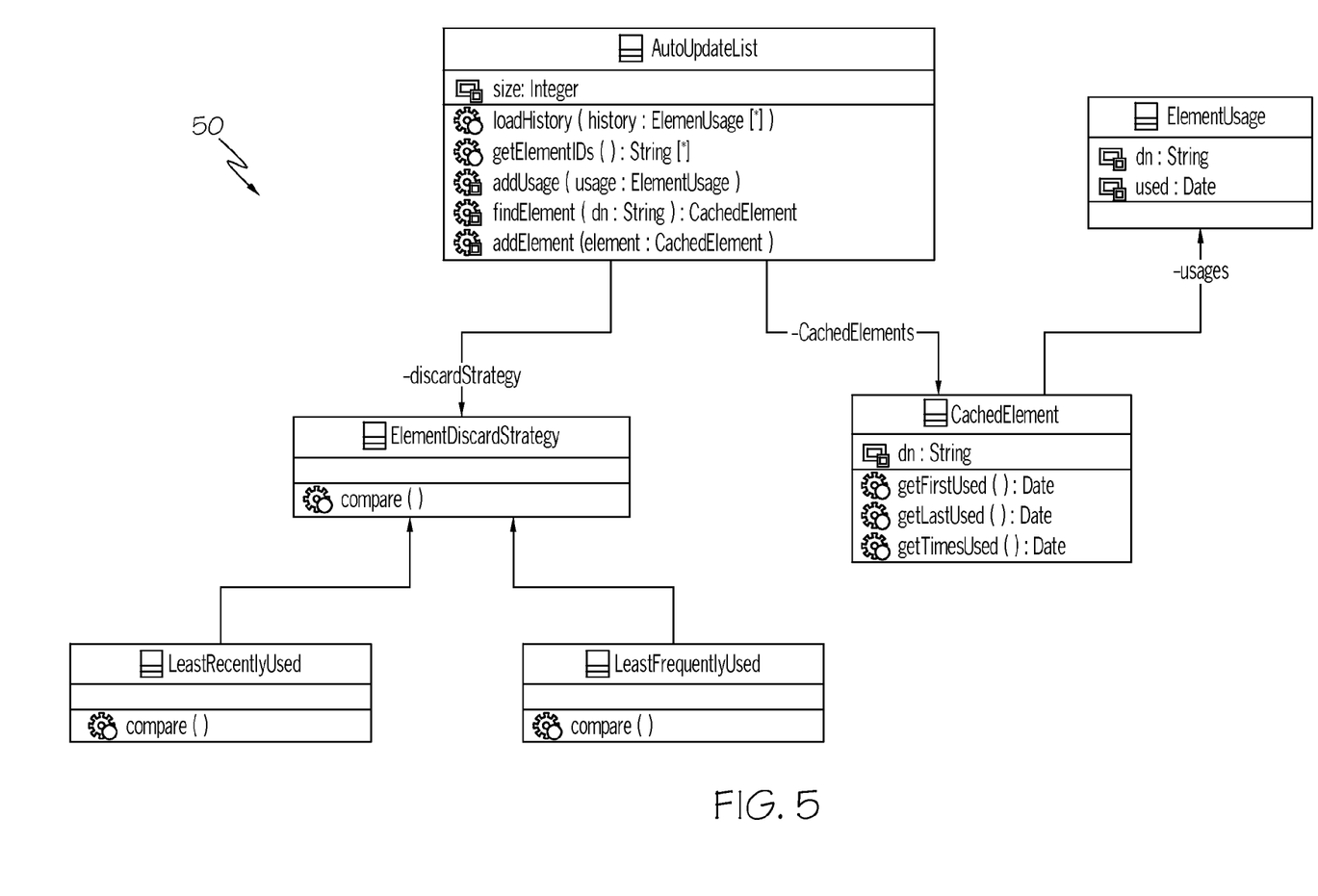
FIG. 5 shows a structure for identifying which instances should be updated during an off-peak period according to embodiments of the invention.

Structure 50 of FIG. 5 illustrates the set of distinguished names (i.e., identifiers) that will be updated by hybrid integrator 34 in the next off-peak synchronization. Off-peak integrator 42 determines the set of instances that are relevant by cross-referencing between the resulting identifiers during the analysis of request log 36. As discussed above, during off-peak hours, a predetermined event triggers off-peak integrator 42 to load the request history into an AutoUpdateList for analysis. In one embodiment, structure 50 uses algorithms and techniques from Cache technology (e.g. Least Recently Used (LRU) and Least Frequently Used (LFU)) to reduce the number of elements to a predefined size. This reduced list provides the identifiers of the objects that should be automatically updated. The ElementUsage represents the history of requests built from the log of the Transaction Recorder. CachedElement represents object instances that are cached in the directory. Each CachedElement contains a collection of the ElementUsages for the DN of the CachedElement. ElementDiscardStrategy represents a selection from a number of strategies for determining which elements should be updated and which should be allowed to go stale. These strategies use cache techniques (e.g. LRU) to determine which elements of the directory to refresh.

Figure 6:
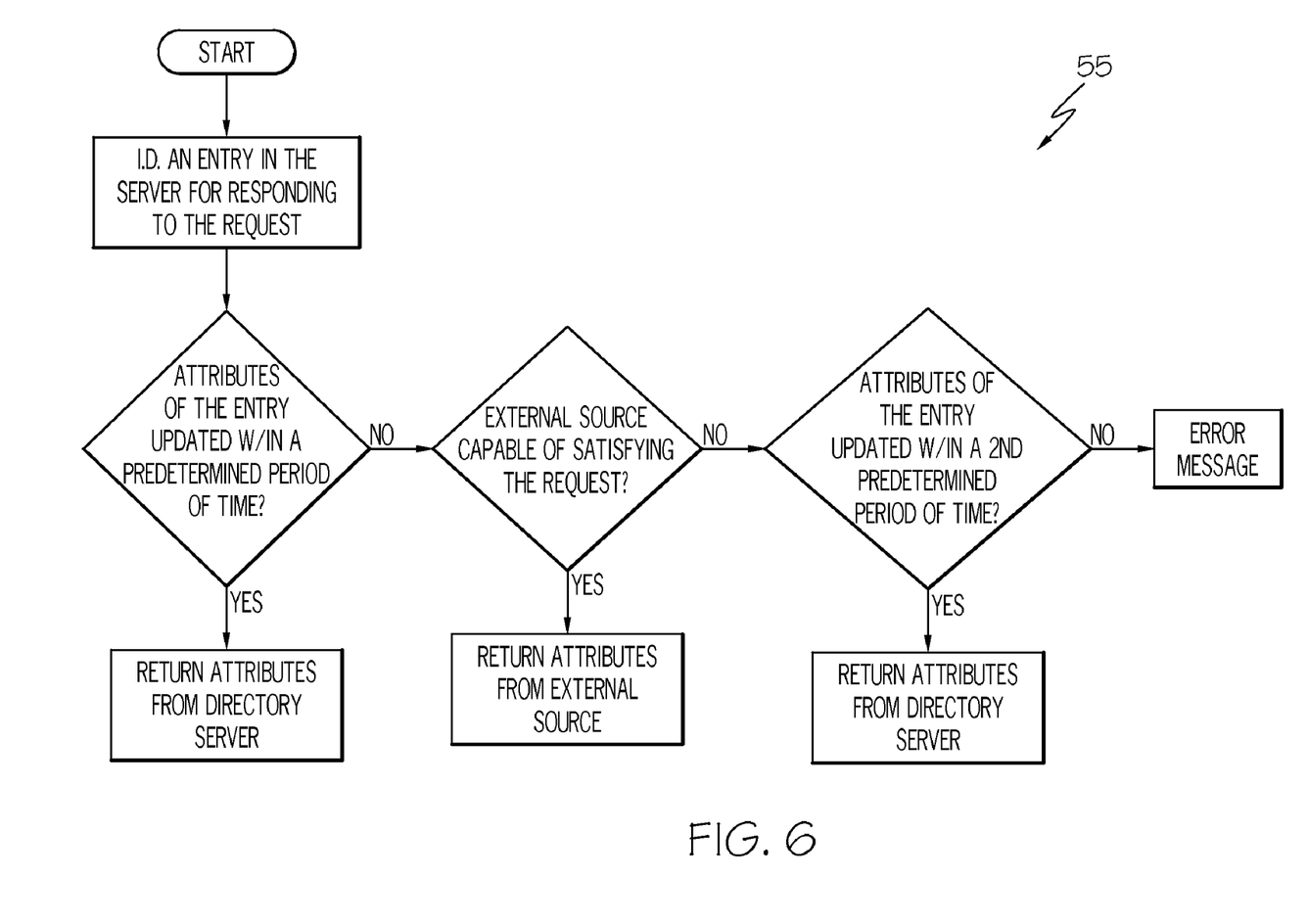
FIG. 6 shows a flow diagram of a method for determining whether a client request can be satisfied by data currently within the directory server according to embodiments of the invention.

Referring now to FIG. 6, a process flow 55 for determining whether a request can be satisfied by data currently within directory server 16 will be described in further detail. As discussed above, when a request is forwarded from hybrid integrator 34, directory server 16 attempts to first retrieve the attributes from directory server 16. In a first step, an entry in directory server 16 is identified for responding to the request. If the entry is found, request handler 30 determines whether one or more attributes of the entry in directory server 16 have been updated within a predetermined period of time. To accomplish this, the refresh/date cached value stored in request handler 30 for the attribute values is checked against a predetermined refresh date to determine if the data is stale and must be refreshed. If the data must be refreshed, the request from client 12 is not capable of being satisfied solely by directory server 16, and data needs to come from external sources 38. Request handler 30 maps (i.e., determines) the location corresponding to set of current attributes 37 for responding to the request from one or more external sources 38A, 38B, or 38C.

Next, it must be determined whether external sources 38 can satisfy the request in the case that directory server 16 has not been updated within a predetermined period of time. If external source 38 is unable to satisfy the request (i.e., the location cannot be mapped), request handler 30 determines whether the one or more attributes of the entry in directory server 16 have been updated within a second predetermined period of time in the case that external sources 38 are unable to satisfy the request. For example, if the identity (i.e., distinguished name) cannot be mapped, then the refresh/date cached value stored in request handler 30 for the attributes is again checked against a second, typically less preferable predetermined refresh date to determine if the values in repository 24 may still be used. If the attribute values are acceptable, the request for the attributes is passed on to directory server 16. However, if the attribute values are not current within the first or second predetermined periods of time, and external sources 38A-38C are unavailable, then the request cannot be satisfied and an error message is returned to client 12. In another embodiment, request handler 30 may determine that the attribute values may be returned even if stale beyond the first and second predetermined periods of time. In yet another embodiment, repository 24 may be pre-loaded if the identity cannot be mapped by request handler 30.

Figure 7:
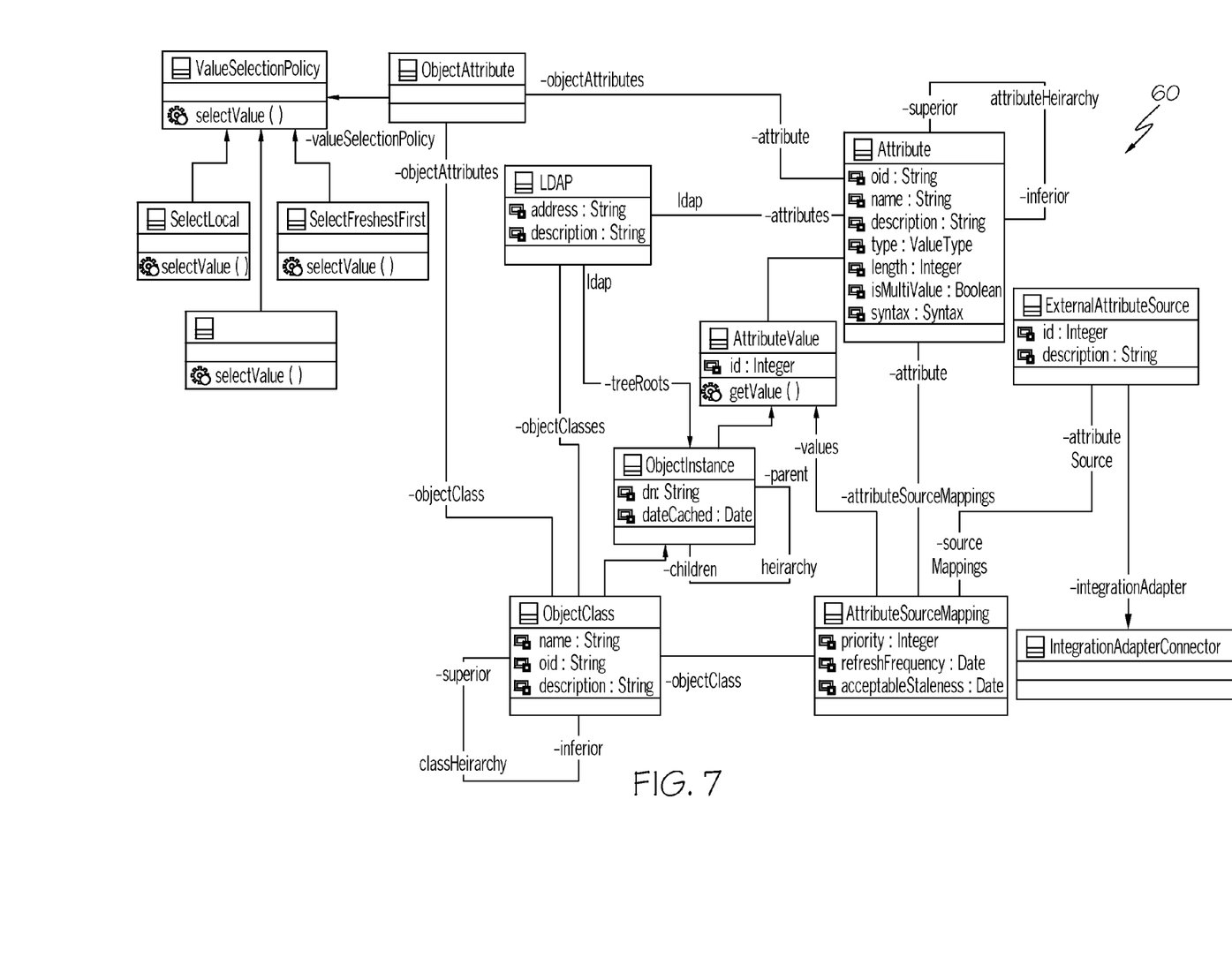
FIG. 7 shows a structure for mapping attribute sources according to an embodiment of the invention.

Referring now to FIG. 7, a structure 60 for mapping attribute sources according to an embodiment of the invention will be described in greater detail. As discussed above, repository 24 maintains both internal attribute values and attribute values from external sources, as well as information on how to retrieve these external values, how long they can be used, and how to select between the values when similar and/or multiple values exist. Initially, request handler 30 (FIG. 2) checks to see if there are instance records in the CacheHistory for the requested instance, which is queried by DN. If records are found, structure 60 finds corresponding AttributeSourceMapping for each CacheHistory. Next, structure 60 evaluates whether AttributeSourceMapping.refreshFrequency+CacheHistory.dateCached<SYSTEMDATE. If the expression evaluates to true, then the data is not stale and may be used. If the expression evaluates to false, the data is stale and should be refreshed. Structure 60 then compares the names (or OIDs) in the incoming request to the names (or OIDs) in the corresponding Attribute (via AttributeSet). Structure 60 returns all of the names (or OIDs) of attributes that are not stale and in the list of attributes to be requested.

If some of the data is not current, structure 60 checks to see if there are instance records in the CacheHistory for the requested instance (queried by DN). If records are found, structure 60 finds corresponding AttributeSourceMapping for each CacheHistory and evaluates whether the AttributeSourceMapping.refreshFrequency+ CacheHistory.dateCached<SYSTEMDATE. If the expression evaluates to true, then the data is not stale and may be used. If the expression evaluates to false, the data is stale and should be refreshed. Structure 60 then compare the names (or OIDs) in the incoming request to the names (or OIDs) in the corresponding Attribute (via AttributeSet). Structure 60 returns AttributeMaps for all of the names and locations (or OIDs) of attributes that are stale and in the list of attributes to be requested. These AttributeMaps represent a set of attributes that must be retrieved from a remote system (e.g., an external source). The AttributeMaps have a remote address and multiple attributes, including the key to retrieve the values. The AttributeMap represents a set of attributes that must be retrieved from a remote system. The AttributeMap has an ExternalAttributeSource (integration interface of the system from which to retrieve the data) and multiple attributes (including the key to retrieve the values). When the AttributeMap.updateRefreshDatesAndValues method is invoked, the AttributeMap updates the corresponding ObjectInstance.dateCached with the System Date and the AttributeValue with the refreshed value.

In the case that multiple attributes are available to satisfy a request, request handler 30 is configured to select a preferred current attribute value from multiple current attributes values. Because an Attribute's value may be retrieved from multiple sources, multiple values may exist in the AttributeStore for each Attribute. As shown in FIG. 7, ValueSelectionPolicy is the component that determines for an ObjectInstance which AttributeValues to return for a given Attribute. The ValueSelectionPolicy makes the decision on the best one or none of them. The ValueSelectionPolicy is selected through the ObjectAttribute so that each combination of ObjectClass and Attribute can have a different ValueSelectionPolicy. The configuration of which ValueSelectionPolicy to use for each combination is made by the directory administrator. Each ValueSelectionPolicy will take into consideration dates, sources, and other data in ranking and selecting an AttributeValue. The algorithm for the selection is determined by the authors of the ValueSelectionPolicys, e.g., anyone with administrative privileges.

After the set of current attribute values are located and subsequently returned to the directory server, structure 60 invokes a AttributeMap.updateRefreshDates method, which updates the corresponding CacheHistory with the a date determined by request handler 30. Request handler 30 updates the data in repository 24 via directory server 16.

In still another embodiment, the methodologies disclosed herein can be used within a computer system to provide off-peak and JIT propagation of directory information. In this case, one or more systems for performing the processes described in the invention can be obtained and deployed to a computer infrastructure. To this extent, the deployment can comprise one or more of (1) installing program code on a computing device, such as a computer system, from a computer-readable storage medium (e.g., a non-transitory computer readable medium); (2) adding one or more computing devices to the infrastructure; and (3) incorporating and/or modifying one or more existing systems of the infrastructure to enable the infrastructure to perform the process actions of the invention.

Figure 8:
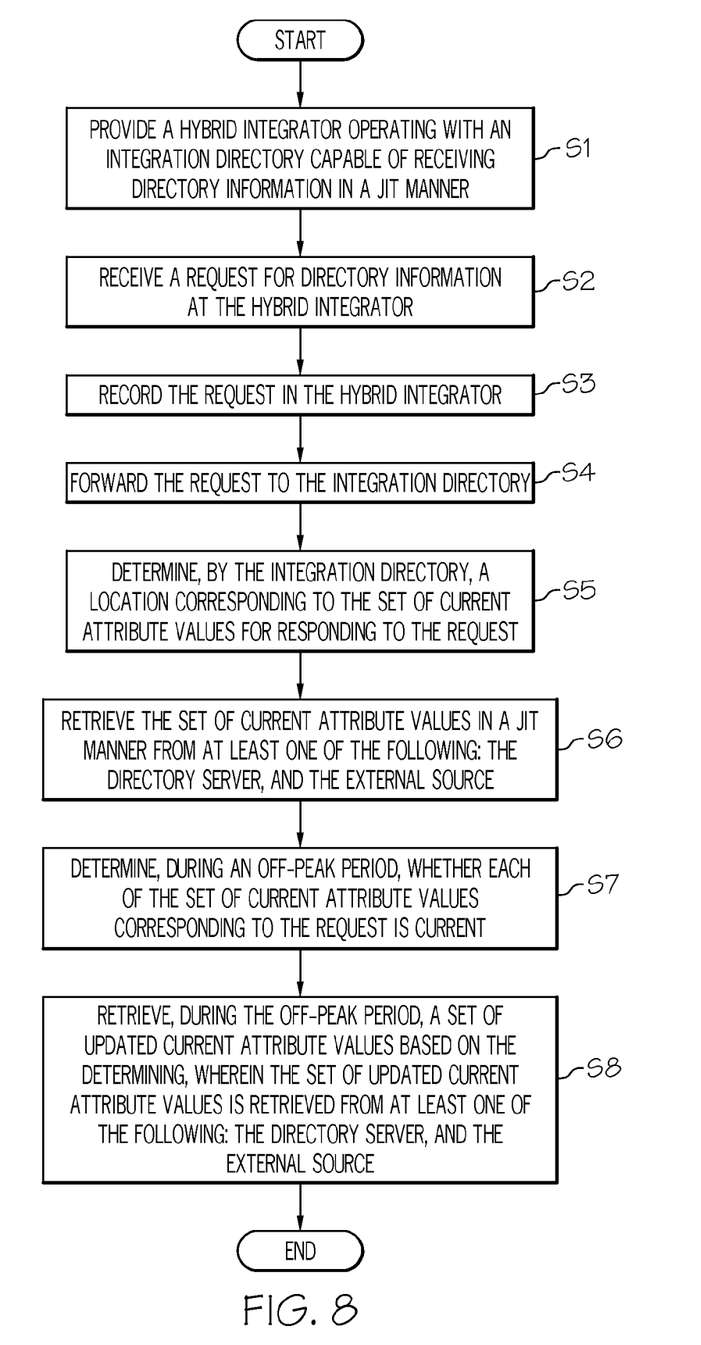
FIG. 8 shows a flow diagram of a method for off-peak and JIT retrieval of directory information according to embodiments of the invention.

Furthermore, one or more program modules may carry out the methodologies disclosed herein, as shown in FIG. 8. According to one embodiment, in step one (S1), a hybrid integrator operating with an integration directory, which receives directory information in a JIT manner, is provided. In S2, the request for directory information is received at the hybrid integrator. In S3, the request is recorded in the hybrid integrator. In S4, the request is forwarded to the integration directory. In S5, a location corresponding to the set of current attribute values for responding to the request is determined by the integration directory. In S6, the set of current attribute values is retrieved in a JIT manner from at least one of the following: the directory server, and an external source. In S7, it is determined, during an off-peak period, whether each of the set of current attribute values corresponding to the request is current. In S8, a set of updated current attribute values is retrieved based on the determining in S7, wherein the set of updated current attribute values is retrieved from at least one of the following: the directory server, and the external source. The flowchart of FIG. 8 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

An implementation of a computer for carrying out the invention may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for off-peak and just-in-time (JIT) retrieval of directory information. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for combining off-peak and just-in-time (JIT) retrieval of directory information, the method comprising:
   providing a hybrid integrator operating with an integration directory capable of retrieving directory information in a JIT manner;
   receiving a request for directory information at the hybrid integrator;
   recording the request in the hybrid integrator;
   forwarding the request to an integration directory after the request is recorded in the hybrid integrator;
   determining, by the integration directory, a location corresponding to a set of current attribute values for responding to the request;
   retrieving the set of current attribute values in a JIT manner from at least one of the following: the directory server, and an external source;
   determining whether each of the set of current attribute values corresponding to the request is current, wherein the determination is delayed until an off-peak period in the case that the request is received during a peak period; and
   retrieving a set of updated current attribute values based on the determining, wherein the retrieving is delayed until the off-peak period in the case that the request is received during the peak period, and wherein the set of updated current attributes is retrieved from at least one of the following: a directory server, and an external source.

2. The method according to claim 1, further comprising:
   returning a set of current attributes to the client;
   asynchronously caching the set of current attribute values in the hybrid integrator; and
   updating a refresh value for each of the set of current attribute values.

3. The method according to claim 2, wherein the determining, during an off-peak period, whether each of the set of attribute values corresponding to the request is current, comprises:
   analyzing a request log recorded in the hybrid integrator to determine a set of distinguished names most likely to be used in the future; and
   comparing the set of distinguished names to the updated refresh value for each of the set of current attribute values.

4. The method according to claim 1, wherein the determining, by the integration directory, a location corresponding to the set of current attribute values for responding to the request, comprises:
   determining, by the integration directory, whether the request can be satisfied by data currently within the directory server; and
   asynchronously retrieving at least one of the set of current attribute values from the external source in the case that the request cannot be satisfied by data currently within the directory server.

5. The method according to claim 4, wherein the determining, by the integration directory, whether the request can be satisfied by data currently within the directory server comprises:
   identifying an entry in the directory server for responding to the request; and
   determining whether one or more attributes of the entry in the directory server have been updated within a predetermined period of time.

6. A directory apparatus for off-peak and just-in-time (JIT) retrieval of directory information, comprising:
   a directory server operable with an integration directory capable of retrieving directory information in a JIT manner;
   memory operably associated with the directory server; and
   a hybrid integrator storable in memory and executable by the directory server, the hybrid integrator comprising:
   a transaction recorder configured to:
      receive a request for directory information; and
      record the request for directory information;
      forward the request to an integration directory after the request is recorded in the hybrid integrator; and
   an off-peak integrator configured to:
      determine, by the integration directory, a location corresponding to a set of current attribute values for responding to the request;
      retrieve the set of current attribute values in a JIT manner from at least one of the following: the directory server, and an external source;
      determine whether each of the set of current attribute values corresponding to the request is current; and
      retrieve a set of updated current attribute values based on the determining, wherein the set of updated current attributes is retrieved from at least one of the following: a directory server, and an external source.

7. The directory apparatus according to claim 6, wherein the integration directory is further configured to:
   return a set of current attributes to the client;
   asynchronously cache the set of current attribute values; and
   update a refresh value for each of the set of current attribute values.

8. The directory apparatus according to claim 7, the off-peak integrator configured to determine, further configured to:
   analyze a request log recorded in the transaction recorder to determine a set of distinguished names most likely to be used in the future; and
   compare the set of distinguished names to the updated refresh value for each of the set of current attribute values.

9. The directory apparatus according to claim 6, the integration directory further configured to:
   determine whether the request can be satisfied by data currently within the directory server; and
   asynchronously retrieve at least one of the set of current attribute values from the external source in the case that the request cannot be satisfied by data currently within the directory server.

10. The directory apparatus according to claim 9, the integration directory configured to determine whether the request can be satisfied by data currently within the directory server further configured to:
    identify an entry in the directory server for responding to the request; and
    determine whether one or more attributes of the entry in the directory server have been updated within a predetermined period of time.

11. A computer-readable storage medium storing computer instructions, which when executed, enables a computer system operating with a directory server to provide off-peak and just-in-time (JIT) retrieval of directory information, the computer instructions comprising:

receiving a request for directory information at a hybrid integrator;
recording the request in the hybrid integrator;
forwarding the request to an integration directory after the request is recorded in the hybrid integrator;
determining, by the integration directory, a location corresponding to a set of current attribute values for responding to the request;
retrieving, by the integration directory, a set of current attribute values in a JIT manner from at least one of the following: the directory server, and an external source;
determining whether each of the set of current attribute values corresponding to the request is current, wherein the determination is delayed until an off-peak period in the case that the request is received during a peak period; and
retrieving a set of updated current attribute values based on the determining, wherein the retrieving is delayed until the off-peak period in the case that the request is received during the peak period, and wherein the set of updated current attributes is retrieved from at least one of the following: a directory server, and an external source.

12. The computer-readable storage medium according to claim 11, the computer instructions further comprising:
returning a set of current attributes to the client;
asynchronously caching the set of current attribute values in the hybrid integrator; and
updating a refresh value for each of the set of current attribute values.

13. The computer-readable storage medium according to claim 12, the computer instructions for determining, during an off-peak period, whether each of the current attribute values corresponding to the request is current comprising:
analyzing a request log recorded in the hybrid integrator to determine a set of distinguished names most likely to be used in the future; and
comparing the set of distinguished names to the updated refresh value for each of the set of current attribute values.

14. The computer readable storage medium according to claim 11, wherein the computer instructions for determining, by the integration directory, a location corresponding to the set of current attribute values for responding to the request comprises:
determining, by the integration directory, whether the request can be satisfied by data currently within the directory server; and
asynchronously retrieving at least one of the set of current attribute values from the external source in the case that the request cannot be satisfied by data currently within the directory server.

15. The computer-readable storage medium according to claim 14, the computer instructions for determining, by the integration directory, whether the request can be satisfied by data currently within the directory server comprising:
identifying an entry in the directory server for responding to the request; and
determining whether one or more attributes of the entry in the directory server have been updated within a predetermined period of time.

16. A method for deploying a hybrid integrator and an integration directory for use in a computer system to provide off-peak and just-in-time retrieval of directory information, comprising:

providing a computer infrastructure operable to:
receive a request for directory information at the hybrid integrator;
record the request in the hybrid integrator;
forward the request to an integration directory after the request is recorded in the hybrid integrator;
determine, by the integration directory, a location corresponding to a set of current attribute values for responding to the request;
retrieve the set of current attribute values in a JIT manner from at least one of the following: a directory server, and an external source;
determine whether each of the set of current attribute values corresponding to the request is current, wherein the determination is delayed until an off-peak period in the case that the request is received during a peak period; and
retrieve a set of updated current attribute values based on the determining, wherein the retrieving is delayed until the off-peak period in the case that the request is received during the peak period, and wherein the set of updated current attributes is retrieved from at least one of the following: a directory server, and an external source.

17. The method according to claim 16, the computer infrastructure further operable to:
return a set of current attributes to the client;
asynchronously cache the set of current attribute values; and
update a refresh value for each of the set of current attribute values.

18. The method according to claim 17, the computer infrastructure operable to determine, by the integration directory, a location corresponding to the set of current attribute values for responding to the request further operable to:
determine, by the integration directory, whether the request can be satisfied by data currently within the directory server; and
asynchronously retrieve at least one of the set of current attribute values from the external source in the case that the request cannot be satisfied by data currently within the directory server.

19. The method according to claim 18, the computer infrastructure operable to determine, by the integration directory, whether the request can be satisfied by data currently within the directory server further operable to:
identify an entry in the directory server for responding to the request; and
determine whether one or more attributes of the entry in the directory server have been updated within a predetermined period of time.

20. The method according to claim 16, the computer infrastructure operable to determine, during an off-peak period, whether each of the current attribute values corresponding to the request is current further operable to:
analyze a request log recorded in the hybrid integrator to determine a set of distinguished names most likely to be used in the future; and
compare the set of distinguished names to the updated refresh value for each of the set of current attribute values.

* * * * *